(12) United States Patent
Shimoozono et al.

(10) Patent No.: US 8,134,616 B2
(45) Date of Patent: Mar. 13, 2012

(54) IMAGING APPARATUS AND PIXEL DEFECT COMPENSATION METHOD IMPLEMENTED THEREIN

(75) Inventors: Akihito Shimoozono, Yokohama (JP); Hideki Jinguji, Yokohama (JP); Tetsuya Oura, Yokohama (JP); Takeshi Ibaraki, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 428 days.

(21) Appl. No.: 12/286,222

(22) Filed: Sep. 29, 2008

(65) Prior Publication Data
US 2009/0231473 A1    Sep. 17, 2009

(30) Foreign Application Priority Data
Mar. 12, 2008  (JP) .................................. 2008-062292

(51) Int. Cl.
H04N 9/64 (2006.01)
(52) U.S. Cl. ....................................................... 348/246
(58) Field of Classification Search .............. 348/222.1, 348/234, 235, 241, 243, 246, 250, 251, 266, 348/268, 272, 273, 274, 277
See application file for complete search history.

(56) References Cited

U.S. PATENT DOCUMENTS

| | | | |
|---|---|---|---|
| 6,765,614 B1 | 7/2004 | Matsukawa | 348/246 |
| 6,977,681 B1* | 12/2005 | Sasai | 348/241 |
| 7,471,820 B2* | 12/2008 | Yeung et al. | 382/149 |
| 7,715,650 B2* | 5/2010 | Muammar et al. | 382/275 |
| 2003/0011693 A1 | 1/2003 | Oda | |
| 2004/0032516 A1 | 2/2004 | Kakarala | |
| 2005/0248671 A1 | 11/2005 | Schweng | |
| 2006/0028233 A1* | 2/2006 | Arazaki | 324/770 |
| 2006/0204127 A1* | 9/2006 | Muammar et al. | 382/274 |

FOREIGN PATENT DOCUMENTS
JP    3227815    9/2001

OTHER PUBLICATIONS
EPO Search Report for Application No. 08166281.9-2202 /2101487 (dated Jun. 22, 2011-6 pages).

* cited by examiner

Primary Examiner — Nicholas Giles
(74) Attorney, Agent, or Firm — Renner, Kenner, Greive, Bobak, Taylor & Weber

(57) ABSTRACT

Pixel signals output from an imaging device having pixels arranged in horizontal and vertical directions are compensated if there are pixel defects. Extracted from the pixel signals are: a first signal from a target pixel; second signals from second pixels having the same color as the target pixel; and third signals from third pixels having a different color from the target pixel, the second and third pixels being located as close to the target pixel on both sides thereof in each direction. Extracted from the second signals are a highest-level signal having the highest luminance level and a second-level signal having the second luminance level. An average luminance level of the second signals is calculated. It is determined whether a particular pixel among the second pixels and causing generation of the highest-level signal is defective by using the highest and average levels. The highest-level signal is selected when the particular pixel is not defective, otherwise, the second-level signal. It is determined whether the target pixel is defective by using the levels of the first and selected signals. The first signal is output when the target pixel is not defective, otherwise, the selected signal.

13 Claims, 10 Drawing Sheets

IMAGING APPARATUS AND PIXEL DEFECT COMPENSATION METHOD IMPLEMENTED THEREIN

CROSS-REFERENCE TO RELATED APPLICATIONS

This application is based on and claims the benefit of priority from the prior Japanese Patent Application No. 2008-062292 filed on Mar. 12, 2008, the entire content of which is incorporated herein by reference.

BACKGROUND OF THE INVENTION

The present invention relates to an imaging apparatus for taking an image of an object with a solid-state imaging device. Particularly, this invention relates to an imaging apparatus having a function of compensating for the pixel signal from a defect pixel of a solid-state imaging device while taking an image of an object, and a method of pixel defect compensation used in the compensating function.

Solid-state imaging devices, such as, CCD (Charge-Coupled Device) and CMOS (Complementary Metal Oxide Semiconductor) may have defective pixels due to semiconductor's local or sectional defects, such as, crystal defects. Taking an image of an object with a solid-state imaging device having such defective pixels generates a pixel signal from a defective pixel, which has a luminance level as high as white. Such defective pixels are thus referred to as white defects in general.

Several inventions have been known for imaging apparatuses equipped with a solid-state imaging device, implemented with a function of compensating in real time a pixel signal generated from a defective pixel and involved in an imaging signal generated while taking an image of an object.

Such inventions are disclosed, for example, in Japanese Patent No. 3227815 and U.S. Pat. No. 6,765,614. In these inventions, a pixel signal from a defective pixel is compensated by being replaced with a pixel signal of a neighboring pixel of the same color as the defective pixel or a pixel signal generated based on several neighboring pixels.

Pixel defects may not always occur at one pixel but may occur at several succeeding pixels in a solid-state imaging device. A pixel signal from a defective pixel cannot be appropriately compensated by being replaced with a pixel signal generated based on several neighboring pixels if one or more of the neighboring pixels are also defective.

It is thus required that a pixel signal from a defective pixel be appropriately compensated by being replaced with a pixel signal generated based on two or more of neighboring and succeeding pixels of the same color as the defective pixel even if the neighboring pixels are also defective.

Moreover, it is required that such neighboring and succeeding defective pixels be distinguished from normal pixels with no defects via which an image of, for example, a white object is taken. This is because a pixel signal generated from a defective pixel has a luminance level as high as white, as discussed above.

Erroneous compensation is caused, for example, when a pixel signal from a normal pixel is misjudged as that from a defective pixel. It is thus further required that pixel signals from normal pixels be correctly distinguished from -those of succeeding defective pixels and compensation be made for the pixel signals from the defective pixels only when the defective pixels are detected, thus erroneous compensation being prevented for the normal pixels.

SUMMARY OF THE INVENTION

A purpose of the present invention is to provide an imaging apparatus with a pixel-defect compensation function and a method of pixel defect compensation to compensate for pixel signals generated from defective pixels even if one or more of neighboring pixels close to each defective pixel are also defective.

Another purpose of the present invention is to provide an imaging apparatus with a pixel-defect compensation function and a method of pixel defect compensation to prevent erroneous compensation of pixel signals for an image that is taken via non-defective pixels which could be erroneously determined as defective pixels due to their luminance levels.

The present invention provides an imaging apparatus comprising: an imaging section that includes an optical filter having a plurality of color filters for a plurality of colors and arranged in horizontal and vertical directions and an imaging device having a plurality of pixels arranged as corresponding to the color filters, the imaging section converting an input optical signal into pixel signals that correspond to the colors and sequentially outputting the pixel signals; a pixel-signal generating section, responsive to the sequentially output pixel signals, to output a first pixel signal generated from a target pixel among the pixels of the imaging device, second pixel signals generated from same-color neighboring pixels having the same color as the target pixel, and third pixel signals generated from different-color neighboring pixels having a different color from the target pixel, the same- and different-color neighboring pixels belonging to the pixels of the imaging device and being located as dose to the target pixel on both sides of the target pixel in each of the horizontal and vertical directions; a first extractor to extract a highest-level pixel signal having the highest luminance level and a second-level -pixel signal having the second luminance level next to the highest luminance level among the second pixel signals; an average-level calculation section to calculate an average luminance level of the second pixel signals; a first determining section to determine whether a particular pixel belonging to the same-color neighboring pixels and causing generation of the highest-level pixel signal is defective or not by using the highest luminance level and the average luminance level; a selecting section to select the highest-level pixel signal when it is determined that the particular pixel is not defective whereas the second-level pixel signal when determined that the particular pixel is defective; a second determining section to determine whether the target pixel is defective or not by using a level of the first pixel signal and a level of the selected pixel signal; and a replacing section to output the first pixel signal when it is determined that the target pixel is not defective whereas the selected pixel signal in place of the first pixel signal when determined that the target pixel is defective.

Moreover, the present invention provides a pixel-defect compensation method comprising: a converting-and-outputting step of converting an input optical signal, via an imaging device having a plurality of pixels arranged in horizontal and vertical directions for a plurality of colors, into pixel signals that correspond to the colors and sequentially outputting the pixel signals; a pixel-signal generating step of, responsive to the sequentially output pixel signals, outputting a first pixel signal generated from a target pixel among the pixels of the imaging device, second pixel signals generated from same-color neighboring pixels having the same color as the target pixel, and third pixel signals generated from different-color neighboring pixels having a different color from the target pixel, the same- and different-color neighboring pixels belonging to the pixels of the imaging device and being located as close to the target pixel on both sides of the target pixel in each of the horizontal and vertical directions; a first extracting step of extracting a highest-level pixel signal having the highest luminance level and a second-level pixel signal having the second luminance level next to the highest luminance level among the second pixel signals; an average-level calculating step of calculating an average luminance level of the second pixel signals; a first determining step of determining whether a particular pixel belonging to the same-color neighboring pixels and causing generation of the highest-level pixel signal is defective or not by using the highest luminance level and the average luminance level; a selecting step of selecting the highest-level pixel signal when it is determined that the particular pixel is not defective whereas the second-level pixel signal when determined that the particular pixel is defective; a second determining step of determining whether the target pixel is defective or not by using a level of the first pixel signal and a level of the selected pixel signal; and an outputting step of outputting the first pixel signal when it is determined that the target pixel is not defective whereas the selected pixel signal in place of the first pixel signal when determined that the target pixel is defective.

DETAILED DESCRIPTION OF PREFERRED EMBODIMENTS

An imaging apparatus and a method of pixel defect compensation implemented in the imaging apparatus according to the present invention will be disclosed with reference to the attached drawings.

Figure 1:
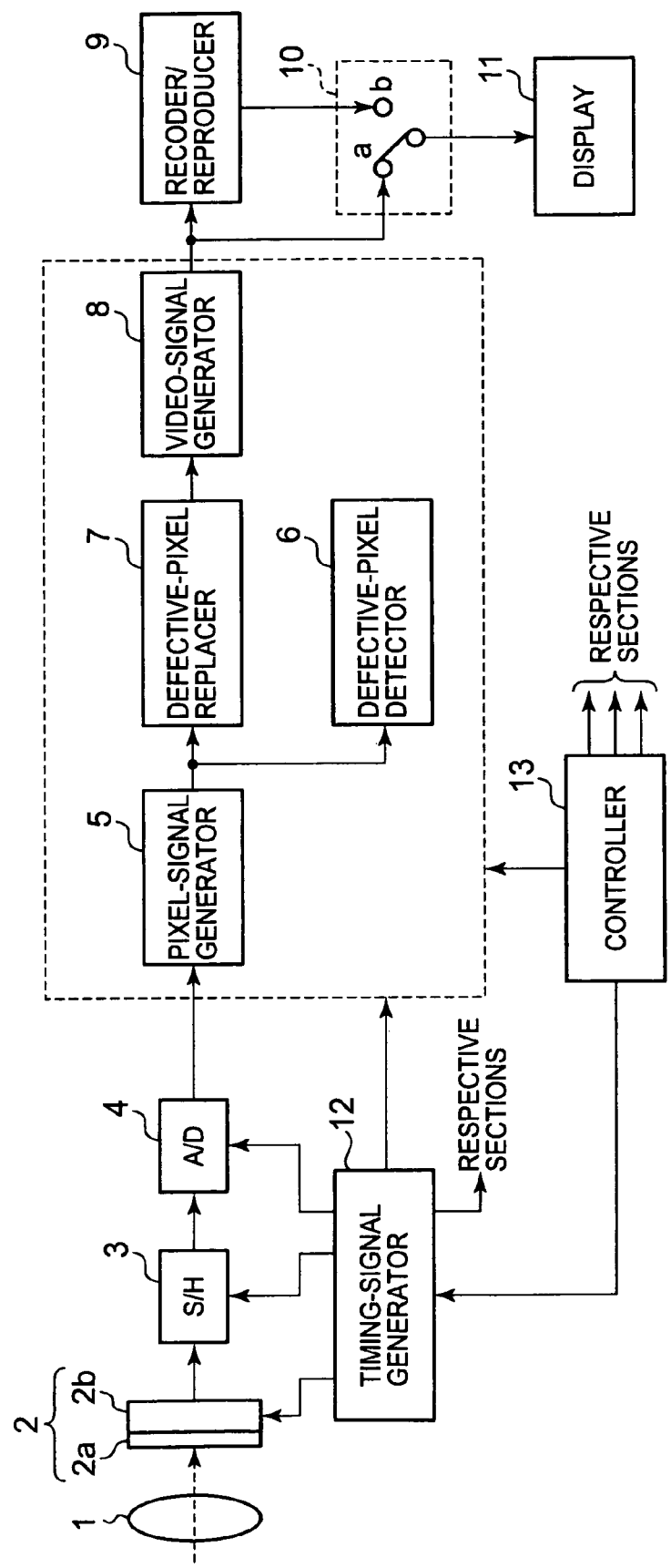
FIG. 1 shows an exemplary block diagram of the entire structure of an imaging apparatus in a preferred embodiment according to the present invention.

FIG. 1 shows an exemplary block diagram of the entire structure of an imaging apparatus in a preferred embodiment according to the present invention.

In FIG. 1, incident light from an object to be taken (not shown) is converged by an imaging lens 1 and emitted to an imaging device 2. The imaging device 2 has an optical filter 2a with specific color-filter arrangements which will be explained later and a solid-state imaging device 2b, such as, CCD and CMOS. The optical filter 2a is integrated into the solid-state imaging device 2b to constitute the imaging device 2.

Figure 2:
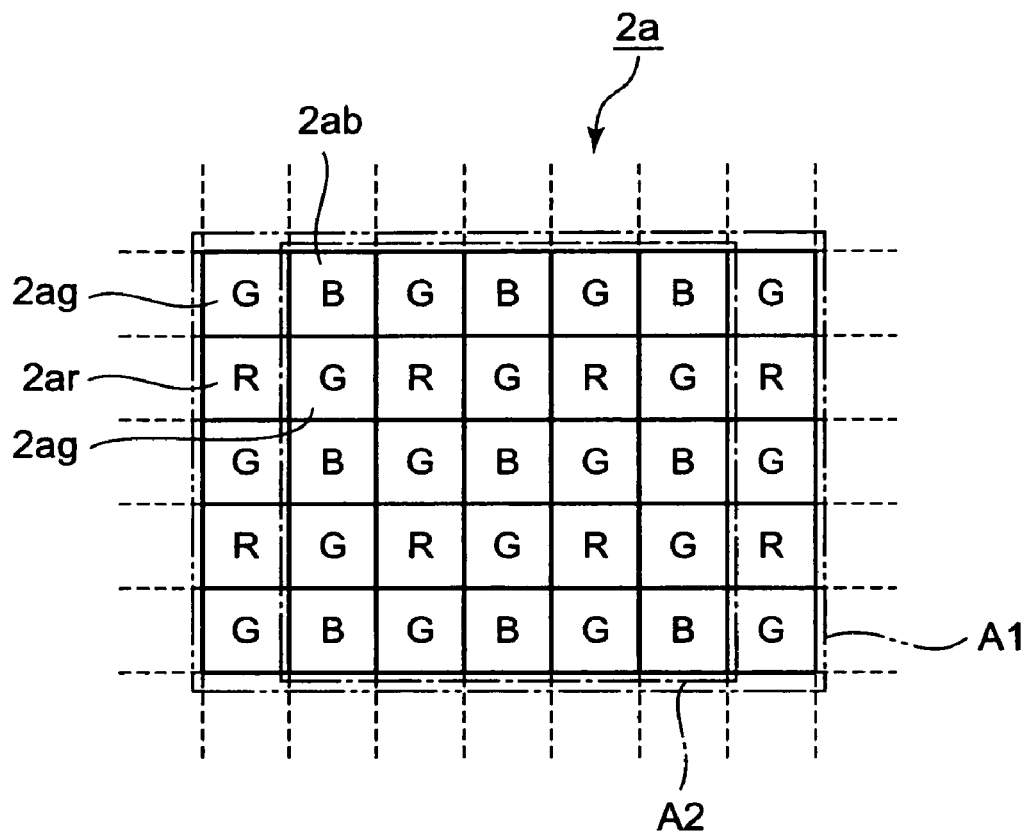
FIG. 2 shows an exemplary color arrangement for an optical filter shown in FIG. 1.

FIG. 2 shows exemplary color-filter arrangements of the optical filter 2a. The arrangements consist of: a line of color filters 2ag for green (G) and color filters 2ab for blue (B) alternately aligned in the horizontal direction; and another line of color filters 2ar for red (R) and color filters 2ag for green (G) alternately aligned in the horizontal direction. The two filter lines are alternately arranged in the vertical direction. Instead of the filter 2a, color filters of any colors, such as complementary colors of magenta, cyan, yellow and green, can be provided which is a matter of design.

The solid-state imaging device 2b consists of pixels arranged in the horizontal and vertical directions so as to correspond to the arrangements of the color filters 2ag, 2ab and 2ar.

In FIG. 1, the incident light emitted to the imaging device 2 is converted into succeeding analog pixel signals (as electrical signals) for respective colors by the solid-state imaging device 2b. The analog pixel signals are sampled and held by a sample-and-hold (S/H) circuit 3 and then output to an A/D converter 4. The analog pixel signals are converted into digital signals by the A/D converter 4 and then supplied to a pixel-signal generator 5.

Each of the pixel signals sequentially output from the imaging device 2 to the pixel-signal generator 5 via the S/H circuit 3 and the A/D converter 4 is a pixel signal generated from a particular pixel of the solid-state imaging device 2b, such as one of the pixels located in a zone A1 surrounded by a long dashed double-short dashed line, as shown in FIG. 2.

Then, the pixel-signal generator 5 generates the following digital pixel signals: a particular pixel signal of a particular pixel located in the zone A1 (FIG. 2); and, at the same timing as the particular pixel signal, several pixel signals of the same color as the particular pixel; and several other pixel signals of different colors from the particular pixel, from several pixels located near and on both sides of the particular pixel in the horizontal and vertical directions.

Figure 3:
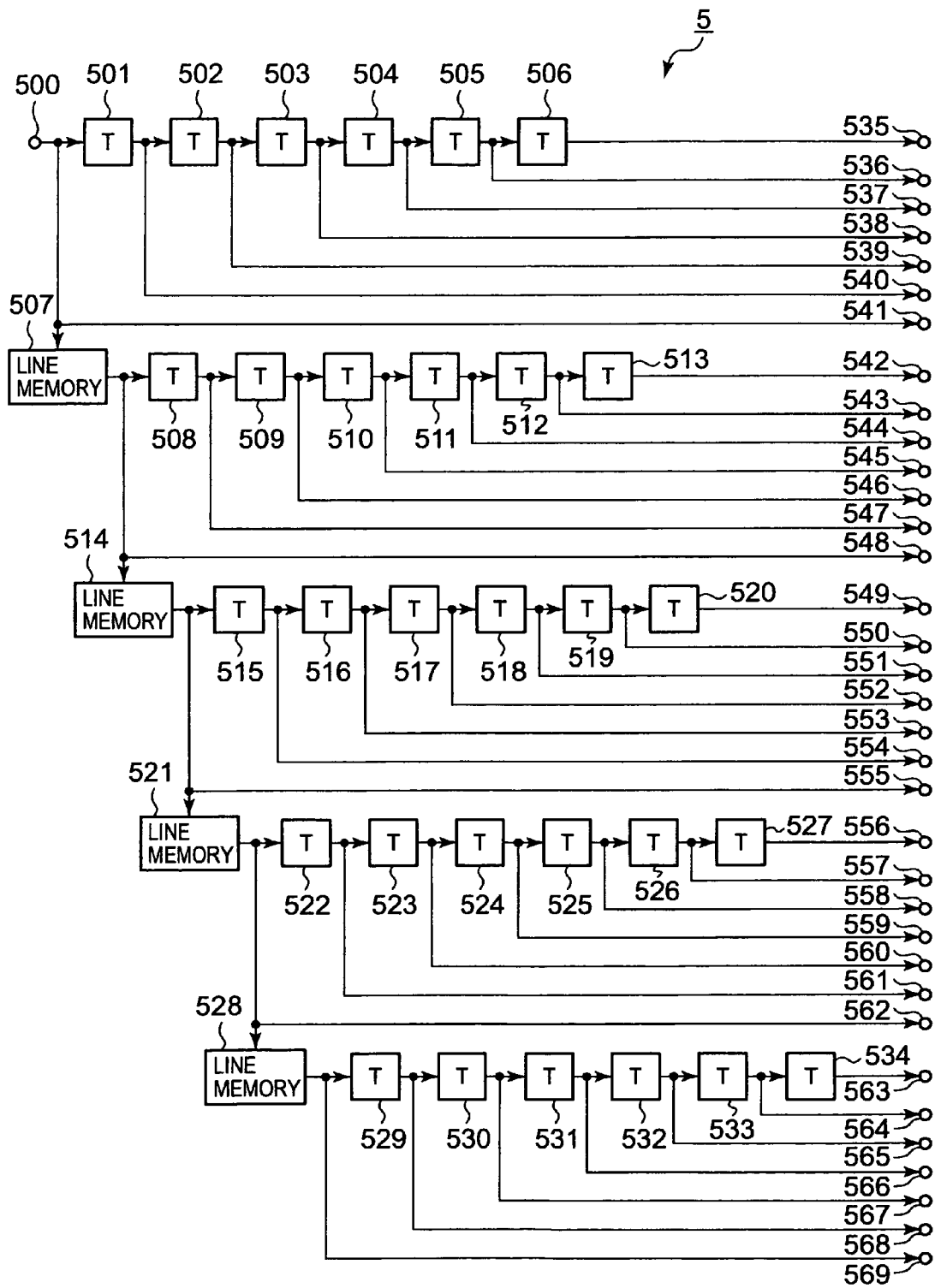
FIG. 3 shows an exemplary circuit configuration of a pixel-signal generator shown in FIG. 1.

Shown in FIG. 3 is an exemplary circuit configuration of the pixel-signal generator 5. Digital pixel signals sequentially input via an input terminal 500 are sequentially delayed by 1-pixel delay units 501 to 506 for each one pixel. The input pixel signals are also supplied to a line memory 507 and delayed by one line. The one-line-delayed pixel signals are sequentially delayed by 1-pixel delay units 508 to 513 for each one pixel. The one-line-delayed pixel signals of the line memory 507 are supplied to a line memory 514 and delayed by one line. The pixel signals thus delayed by one line are sequentially delayed by 1-pixel delay units 515 to 520 for each one pixel. The one-line-delayed pixel signals of the line memory 514 are supplied to a line memory 521 and delayed by one line. The pixel signals thus delayed by one line are sequentially delayed by 1-pixel delay units 522 to 527 for each one pixel. The one-line-delayed pixel signals of the line memory 521 are supplied to a line memory 528 and delayed by one line. The pixel signals thus delayed by one line are sequentially delayed by 1-pixel delay units 529 to 534 for each one pixel.

Through the operation explained above, pixel signals of the colors corresponding to the color filters 2ar, 2ag and 2ab for the 7 pixels in the horizontal direction and 5 pixels in the vertical direction, or 35 pixels in total located in the zone A1 of FIG. 2, are output from output terminals 535 to 569 in FIG. 3, at the same timing.

This embodiment employs pixel signals from the 35 pixels in pixel defects detection and replacement (compensation) of pixel signals from defective pixels, as described later. The number of pixels to be covered in the detection and replacement (compensation), however, depends on the color arrangements in the optical filter 2a, or depends on the design of the filter 2a.

In FIG. 1, the pixel signals from the 35 pixels described above are supplied from the pixel-signal generator 5 to a defective-pixel detector 6 and a defective-pixel replacer 7.

The defective-pixel detector 6 detects whether or not a pixel signal from a particular pixel among the pixel signals from the 35 pixels is the one generated from a defective pixel and supplies a detection-result signal to the defective-pixel replacer 7. The defective-pixel replacer 7 outputs the pixel signal from the particular pixel as it is when the detection-result signal indicates that the particular pixel is a normal pixel with no defects. On the other hand, the replacer 7 replaces the pixel signal from the particular pixel with another pixel signal from another normal pixel of the same color as the particular pixel and outputs the other pixel signal when the detection-result signal indicates that the particular pixel is defective.

The detailed configurations and operations of the defective-pixel detector 6 and defective-pixel replacer 7 will be described later in detail.

The pixel signals output from the defective-pixel replacer 7 are sequentially supplied to a video-signal processor 8. The processor 8 generates a video signal based on the input pixel signals for the respective colors, with several signal processings, which video signal is supplied to a recorder/reproducer 9 or a display 11 via a switch 10.

The recorder/reproducer 9 is equipped with a storage medium, such as, a hard-disk drive, an optical disc, a magnetic tape, and a semiconductor memory. When instructed by a controller 13 to record a video signal, the recorder/reproducer 9 records the input video signal. The display 11 displays the video signal supplied via a terminal "a" of the switch 10.

When the controller 13 instructs the recorder/reproducer 9 to reproduce the recorded video signal, the switch 10 is turned onto a terminal "b" under control by the controller 13, and the display 11 displays a reproduced video signal supplied via the terminal "b" of the switch 10.

Also provided in FIG. 1 is a timing-signal generator 12 that generates several timing signals which are supplied to respective sections of the imaging apparatus that require the timing signals.

The controller 13, which may be a microcomputer, controls respective sections of the imaging apparatus, in addition to the recorder/reproducer 9 and the switch 10.

As indicated by a dashed line in FIG. 1, the pixel-signal generator 5, the defective-pixel detector 6, the defective-pixel replacer 7, and the video-signal processor 8 may be integrated in an integrated circuit. Or, the generator 5, the detector 6, and the replacer 7 may be integrated in an integrated circuit and the processor 8 may be installed as another integrated circuit. Not only that, how to integrate the respective sections of the imaging apparatus is a matter of design. Moreover, some sections of the imaging apparatus may be achieved with software, or the imaging apparatus may be achieved with the combination of hardware and software, which is also a matter of design.

Described next with reference to FIGS. 4 to 9 are the principle of defective-pixel detection and compensation at the defective-pixel detector 6 and the defective-pixel replacer 7, respectively.

Figure 4:
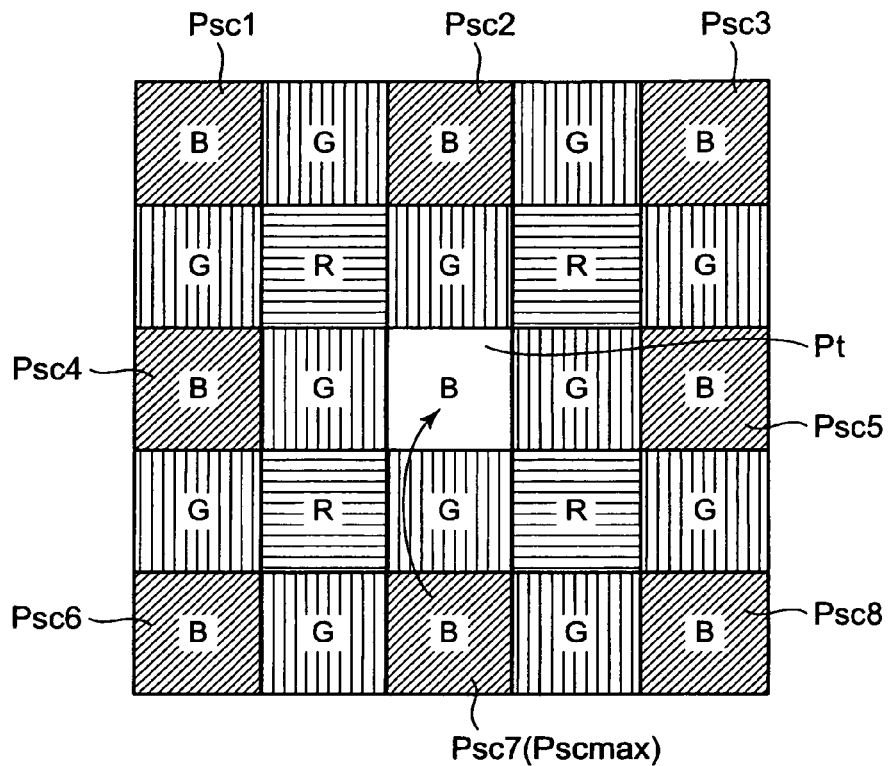
FIG. 4 illustrates defective-pixel detection and compensation in a preferred embodiment according to the present invention.

FIG. 4 illustrates 5 pixels in the horizontal direction and also 5 pixels in the vertical direction, 25 pixels in total, that correspond to the color filters 2ar, 2ag and 2ab located in a zone A2, as shown in FIG. 2, surrounded by a long dashed short dashed line.

In the following description, a target pixel to be detected for defects is a pixel Pt of the color B and located in the center in FIG. 4. The pixel signal from the target pixel Pt is output from the output terminal 552 shown in FIG. 3.

Determination as to whether the target pixel Pt is a defective pixel or not is performed as follows:

Located in the zone A2 (FIG. 2) are 8 pixels of neighboring pixels Psc1 to Psc8 of the same color as the target pixel Pt. Pixels of the same color as the target pixel Pt are referred to as same-color neighboring pixels because they are close to one another although there are several pixels of different colors therebetween. Thus, the pixels such as Psc1 to Psc8 having the same color as the target pixel Pt are referred to as same-color neighboring pixels, in the following description.

One particular pixel Pscmax is then extracted among the same-color neighboring pixels Psc1 to Psc8, from which a pixel signal of the highest luminance level Lscmax is generated.

In the following description, the term "level" means a luminance level carried by a pixel signal, and the suffixes "sc" and "dc" attached to a pixel P and a level L mean the same color and different color, respectively.

Figure 13:
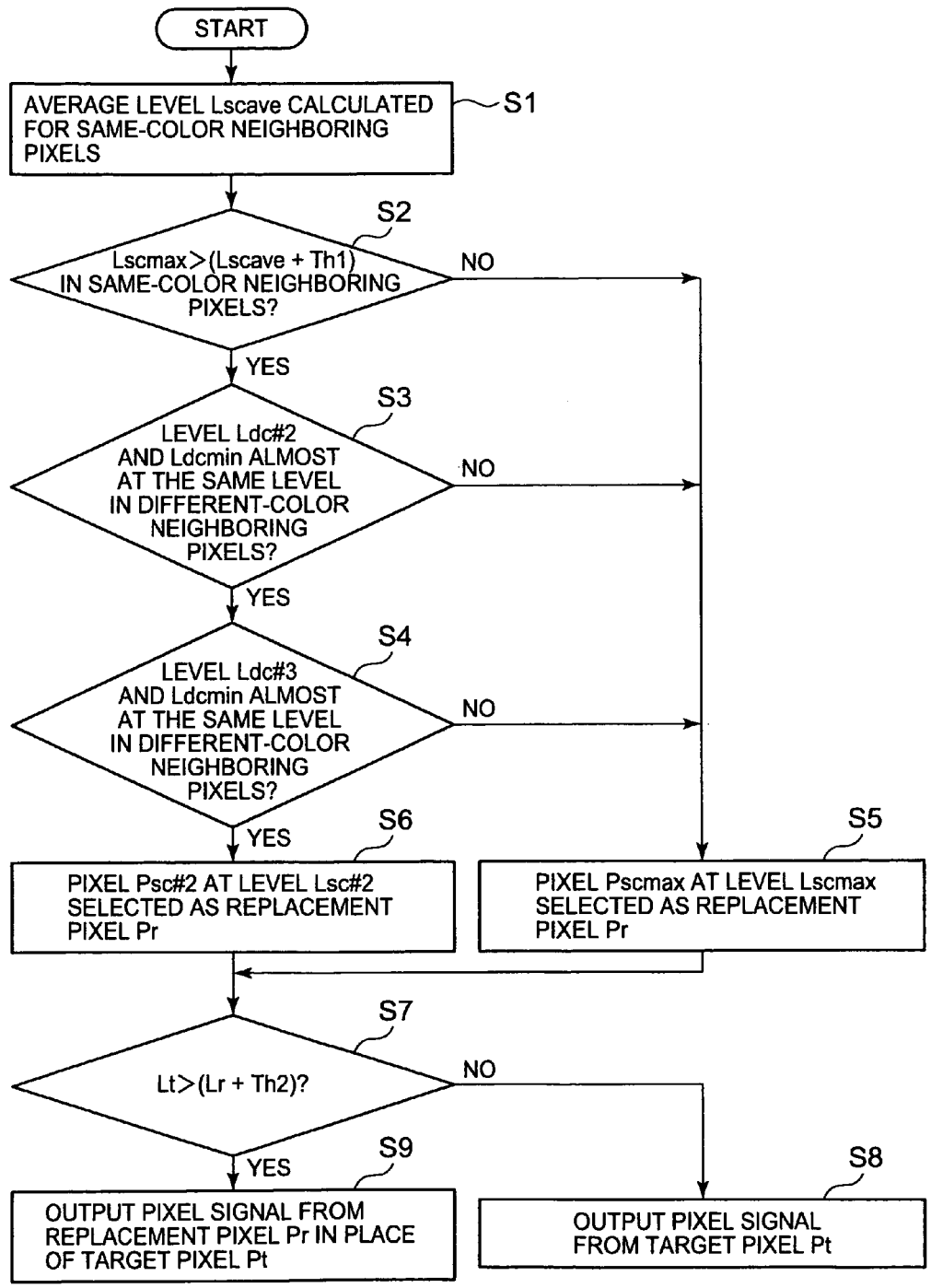
FIG. 13 shows an exemplary flowchart for the operations of a defective-pixel detector and a defective-pixel replacer shown in FIG. 1.

The target pixel Pt is determined as a defective pixel if a level of the pixel Pt is higher than a specific level that is an addition of the highest level Lscmax and a specific reference level (a reference level Th2 which is shown in FIG. 13 and will be explained later).

In FIG. 4, the same-color neighboring pixel Psc7 is illustrated as the pixel Pscmax from which a pixel signal of the highest level Lscmax is generated. The pixel signal from the target pixel Pt is then compensated, if determined as a defective pixel as described above, by being replaced with the pixel signal (of the highest level Lscmax) from the pixel Pscmax.

The defective-pixel compensation method described above is easier and requires a smaller circuit scale, with practically high compensation accuracy, than other methods such as the following:

The pixel signal of the target pixel Pt is replaced with that of a neighboring pixel having the highest correlation with the pixel Pt among the same-color neighboring pixels Psc1 to Psc8.

A pixel-signal compensation value is generated from a pair of pixels having the highest correlation with the target pixel Pt among several pairs of pixels located on both sides of the pixel Pt in the horizontal and vertical directions and also two diagonal directions.

Figure 5:
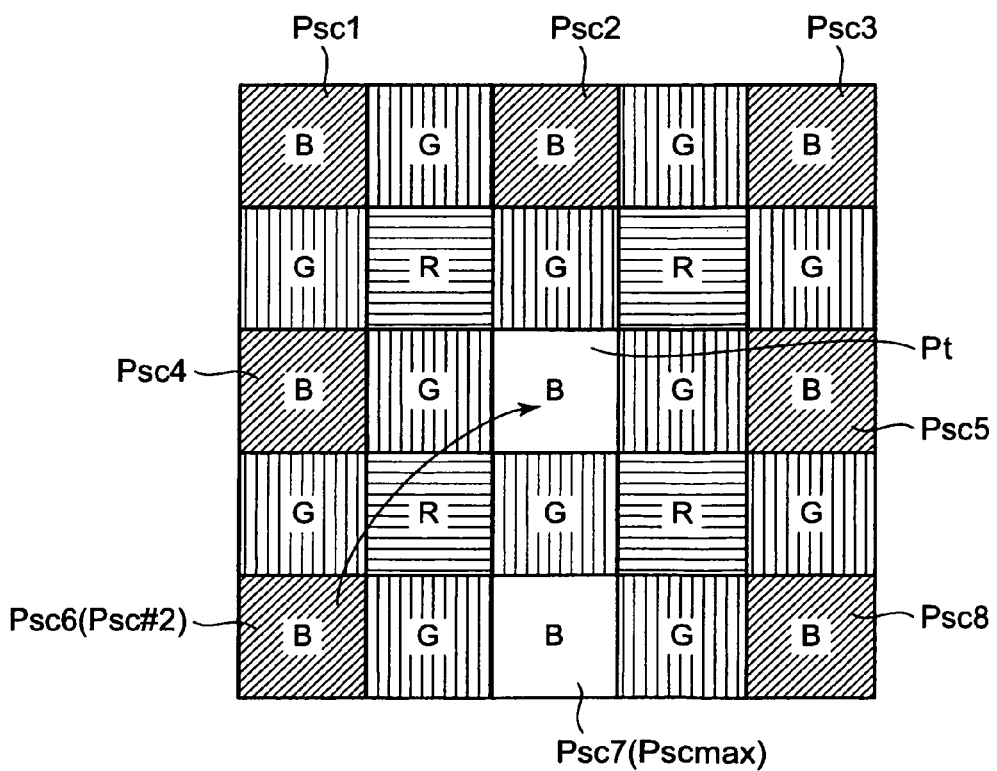
FIG. 5 illustrates defective-pixel detection and compensation in a preferred embodiment according to the present invention.

Described next with respect to FIG. 5 is the defective-pixel detection and compensation methods for two neighboring defective pixels, such as, the target pixel Pt and one of the same-color neighboring pixels Psc1 to Psc8. In FIG. 5, the neighboring pixel Psc7 is illustrated as a defective pixel as well as the defective pixel Pt.

Adopting the method described with respect to FIG. 4 in the situation illustrated in FIG. 5 causes erroneous compensation because the pixel signal from the neighboring pixel Psc7 has the highest level Lscmax, resulting in replacement of the pixel signal of the defective pixel Pt with that of the defective pixel Psc7.

Such erroneous compensation is prevented by way of the methods described below.

Obtained first is an average level Lscave of the pixel signals from the same-color neighboring pixels Psc1 to Psc 8 having the same color as the target pixel Pt. It is then determined that a pixel Pscmax (the neighboring pixel Psc7 in FIG. 5) from which a pixel signal of the highest level Lscmax is generated is not normal but defective if the highest level Lscmax is higher than a specific level that is an addition of the average level Lscave and a specific reference level (a reference level Th1 which is shown in FIG. 13 and will be explained later).

If the pixel Pscmax (the neighboring pixel Psc7 in FIG. 5) is determined as defective, a pixel Psc#2 is extracted among the same-color neighboring pixels Psc1 to Psc 8, from which a pixel signal of the second-highest level Lsc#2 next to the highest level Lscmax is generated. In FIG. 5, the neighboring pixel Psc6 is illustrated as the pixel Psc#2. The pixel signal from the target defective pixel Pt is then correctly compensated by being replaced with that of the pixel Psc#2.

The defective-pixel detection and compensation methods described with reference to FIGS. 4 and 5 are the basic methods in the present embodiment.

Although the methods described with reference to FIG. 5 achieve correct compensation in the situation such as illustrated in FIG. 5, it is still not perfect, or might fail in compensation in particular cases.

Described next with reference to FIGS. 6 to 9 are defective-pixel detection and compensation methods that are advanced versions of those described with reference to FIGS. 4 and 5.

Illustrated in FIGS. 6 to 9 is the situation in which an image of an object is taken, a part of the object being a high luminance-level section such as a white character with a long and narrow portion. A pixel signal from such a long and narrow portion of a white character is inevitably similar to that from succeeding defective pixels, thus could suffering erroneous compensation. It is thus required to distinguish between normal pixels via which a high luminance-level image is taken and succeeding defective pixels, in order to avoid erroneous compensation.

Figure 6:
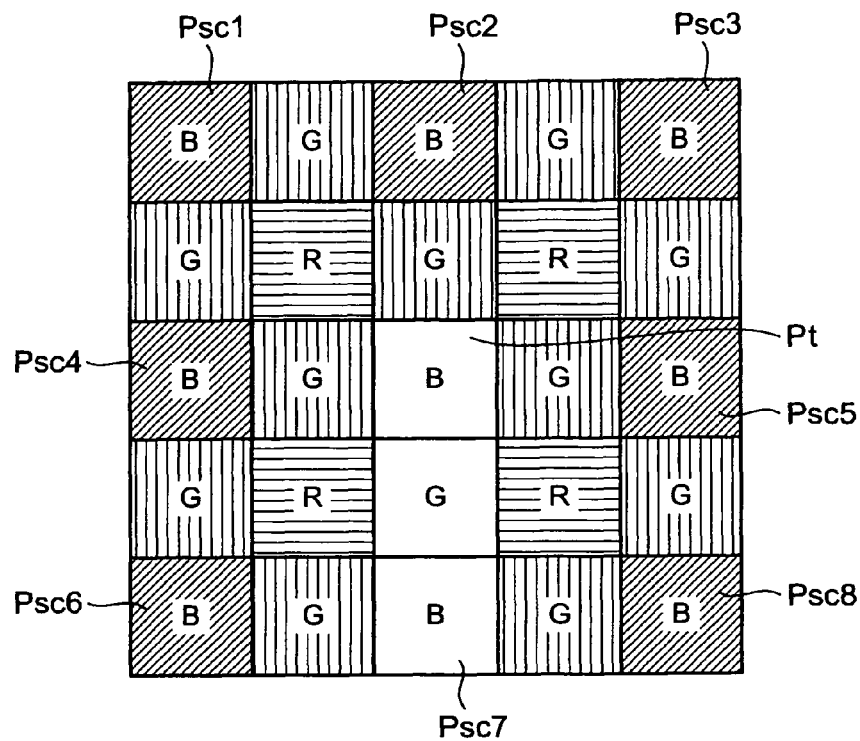
FIG. 6 illustrates defective-pixel detection and compensation in a preferred embodiment according to the present invention.

Illustrated in FIG. 6 is a defective situation with three succeeding defective pixels including the target pixel Pt. Illustrated in FIG. 7 is a normal situation with nine non-defective pixels, including the pixel Pt, via which the image of a portion of a white character is being taken.

Figure 7:
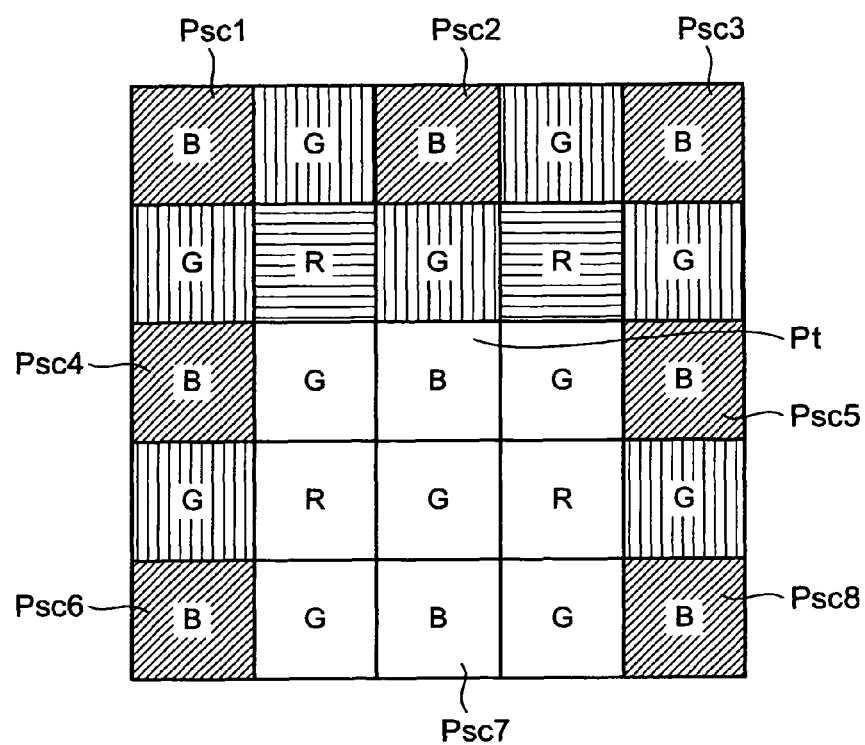
FIG. 7 illustrates defective-pixel detection and compensation in a preferred embodiment according to the present invention.

One precondition in the explanation of the defective-pixel detection and compensation methods with reference to FIGS. 6 and 7 is that, like in FIG. 5, one of the same-color neighboring pixels Psc1 to Psc8 that surrounds the target pixel Pt has a high level as a defective pixel or a level high enough like a defective pixel and the other neighboring pixels have a low level.

The defective situation illustrated in FIG. 6 can be compensated with the defective-pixel detection and compensation methods described with reference to FIG. 5 whereas the normal situation in FIG. 7 suffers erroneous compensation if the methods in FIG. 5 are adopted.

The defective situation (with a defective image) shown in FIG. 6 and the normal situation (with a normal image of a high luminance level) shown in FIG. 7 are distinguished from each other by using a pixel signal from a pixel of a different color from the target pixel Pt and located in the zone Al shown in FIG. 2.

The zone A1 focused on in the distinguishing procedure described above is a larger zone than the zone A2 also shown in FIG. 2.

The zone A2 is focused on in compensation of the pixel signal from the target pixel Pt by replacing this pixel signal with the pixel signal from the pixel Pscmax or Psc#2 among the same-color neighboring pixels Pscl to Psc8 of the same color as the pixel Pt (all located in the zone A2), as already described.

Figure 8:
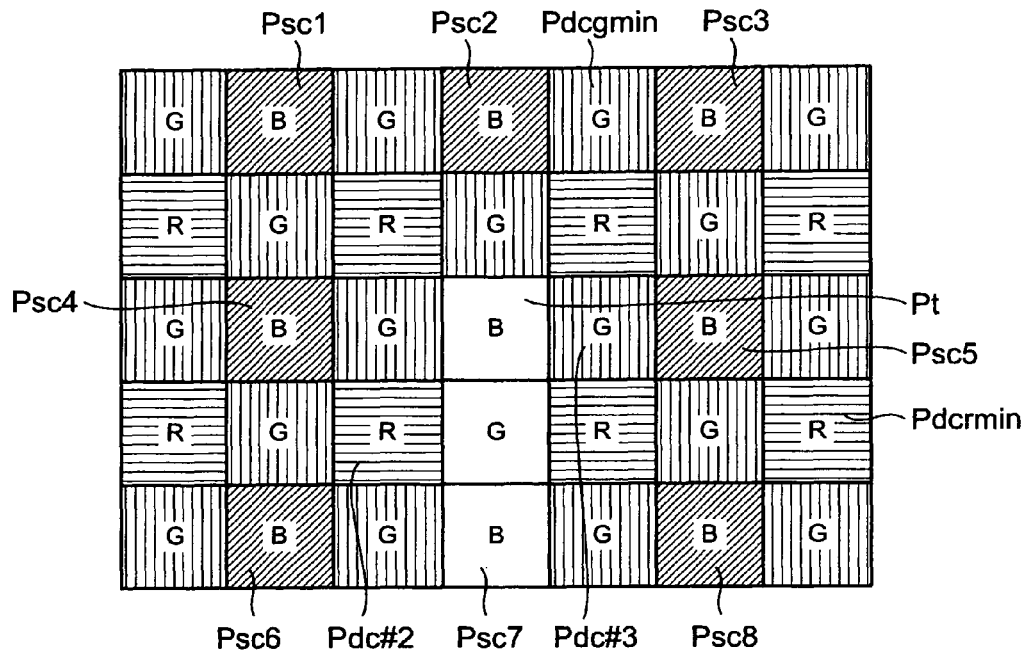
FIG. 8 illustrates defective-pixel detection and compensation in a preferred embodiment according to the present invention.
Figure 9:
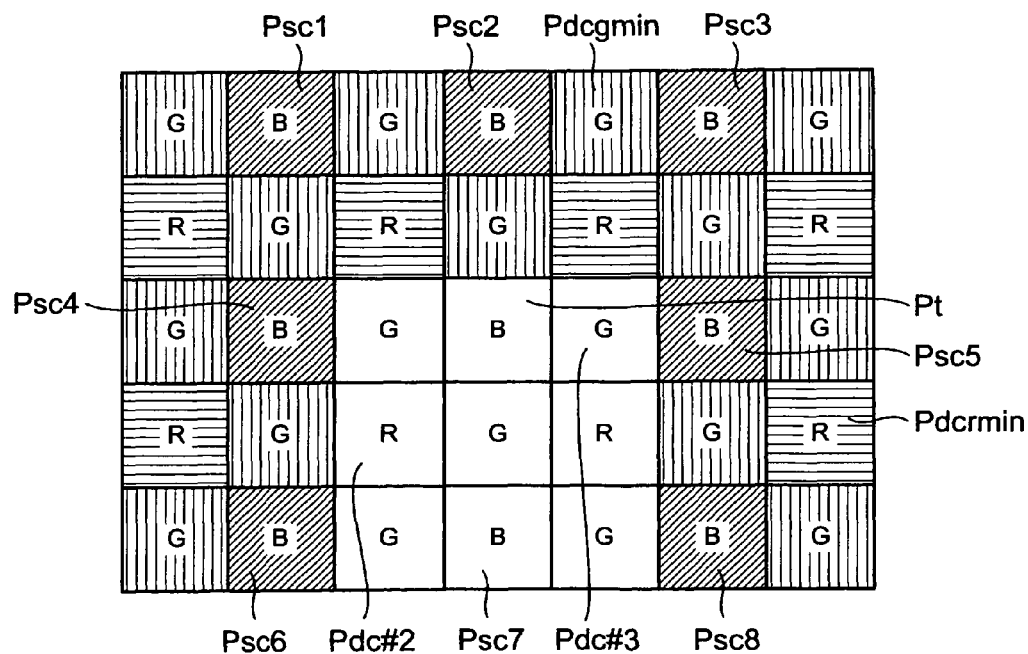
FIG. 9 illustrates defective-pixel detection and compensation in a preferred embodiment according to the present invention.

Illustrated in FIGS. 8 and 9 are 35 pixels (7 in the horizontal direction and 5 in the vertical direction) that correspond to the 35 color filters 2ar, 2ag and 2ab located in the zone A1 shown in FIG. 2. Several pixels of different colors from the target pixel Pt are located in the zone A1, which are: different-color neighboring pixels located close to the pixel Pt; and other different-color pixels that are located as to surround the different-color neighboring pixels. The different-color neighboring pixels and those surrounding the different-color neighboring pixels are referred to as different-color surrounding pixels in the following description.

Extracted first in the procedure for distinguishing between the situations such as illustrated in FIGS. 6(8) and 7(9) are: a pixel Pdc#2 from which a pixel signal of the second-highest level Ldc#2 is generated among the different-color surrounding pixels; and a pixel Pdc#3 from which a pixel signal of the third-highest level Ldc#3 is generated among the different-color surrounding pixels. The pixels Pdc#2 and Pdc#3 are for the colors of R and G, respectively, in FIGS. 8 and 9, which may, however, be for the same color.

One feature in this embodiment is that a particular pixel is not extracted, generated from which is a pixel signal of the highest level in the different-color surrounding pixels defined as above. With no extraction of that particular pixel, it is possible to distinguish between the two situations such as illustrated in FIGS. 6 and 7. This is because, succeeding defective pixels, such as shown in FIG. 6, often include only one defective pixel in the different-color surrounding pixels. In contrast, there are two or more of non-defective pixels of a high level in the different-color surrounding pixels for an image such as shown in FIG. 7.

Extracted next in the procedure for distinguishing between the situations such as illustrated in FIGS. 6(8) and 7(9) are a pixel Pdcrmin of the lowest level Ldcrmin among the pixels of the same color as the pixel Pdc#2 and a pixel Pdcgmin of the lowest level Ldcgmin among the pixels of the same color as the pixel Pdc#3.

The situations such as illustrated in FIGS. 6(8) and 7(9) are then distinguished from each other by comparing the levels Ldc#2 and Ldc#3, and the lowest levels Ldcrmin and Ldcgmin, respectively. Almost the same level between Ldc#2 and Ldcrmin, and also between Ldc#3 and Ldcgmin is determined as being derived from the succeeding defective pixels such as illustrated in FIG. 8. At least either of the levels Ldc#2 and Ldcrmin or the levels Ldc#3 and Ldcgmin of not almost the same level as each other is determined as being derived from normal pixels via which an image such as illustrated in FIG. 9 is taken.

If the pixels Pdc#2 and Pdc#3 are for the same color R, both of the levels Ldc#2 and Ldc#3 can be compared with the lowest level Ldcrmin to determine whether they are almost the same level. On the other hand, if the pixels Pdc#2 and Pdc#3 are of the same color G, both of the levels Ldc#2 and Ldc#3 can be compared with the lowest level Ldcgmin to determine whether they are almost the same level.

The term "almost the same level" is defined that the difference between two levels to be compared is within a specific range, which will be explained later in detail.

When it is determined that the target pixel Pt is not involved in the pixels via which an image is taken such as illustrated in FIG. 7 but involved in the succeeding defective pixels such as illustrated in FIG. 6, the procedure described with reference to FIG. 5 is conducted. In detail, the pixel signal from the defective target pixel Pt is then correctly compensated by being replaced with that of the pixel Psc#2 having the second-highest level Lsc#2.

In contrast, when it is determined that the target pixel Pt is involved in the pixels via which an image is taken such as illustrated in FIG. 7, the pixel signal from the non-defective or normal pixel Pt is output from the defective-pixel replacer 7 to the video-signal processor 8 in FIG. 2.

In FIG. 7, the zone A1 is an extended version of the zone A2 to which one pixel line is added on both sides of the zone A2 in the horizontal direction. The zone A1 may, however, be provided by adding one pixel line on both sides of the zone A2 in the vertical direction or in both of the horizontal and vertical directions. A wider zone A1 tends to cause erroneous determination on an image with normal pixels such as illustrated in FIG. 7. A most feasible zone for the different-color surrounding pixels for correct determination on such an image of FIG. 7 is the zone A1 provided by adding one pixel line on both sides of the zone A2 (from which the pixel Pscmax or Psc#2 is extracted from the same-color neighboring pixels) in the horizontal or vertical direction. Addition of one pixel line on both sides of the zone A2 in the horizontal direction is more feasible than the vertical direction due to a larger number of line memories (FIG. 3) being required for the vertical direction.

Discussed next is a specific zone for determination on the "almost the same level" described with reference to FIG. 8.

Figure 10:
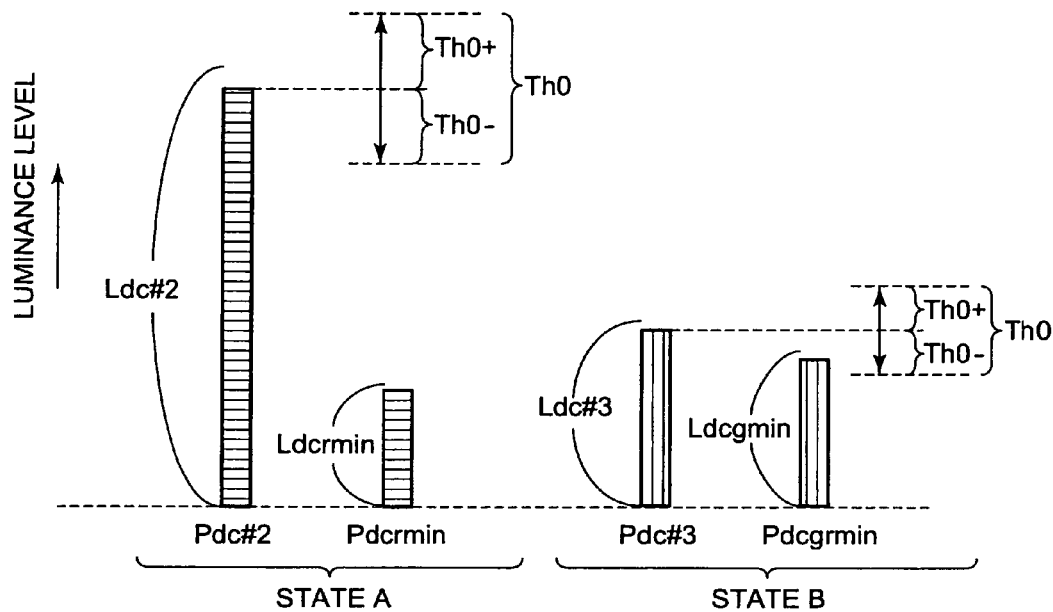
FIG. 10 illustrates reference luminance levels used in defective-pixel detection and compensation in a preferred embodiment according to the present invention.

Illustrated in FIG. 10 are: STATE A in which a pixel signal from the pixel Pdc#2 has a high luminance level Ldc#2; and STATE B in which a pixel signal from the pixel Pdc#3 has a low luminance level Ldc#3. Illustrated next to the high level Ldc#2 (STATE A) and the low level Ldc#3 (STATE B) are the lowest level Ldcrmin of the pixel Pdcrmin and the lowest level Ldcgmin of the pixel Pdcgmin, respectively.

Defined in the following description are: the lowest level Ldcmin with no color specified, which is either the lowest level Ldcrmin or Ldcgmin; and a pixel Pdcmin with no color specified, from which a pixel signal of the lowest level Ldcmin is generated.

One precondition in STATE A (STATE B) of FIG. 10 in this embodiment is that the level Ldc#2 (Ldc#3) is "almost the same level" as the lowest level Ldcmin when the level Ldcmin is located in a range Th0 from a negative reference level Th0− to a positive reference level Th0+ in which the level Ldc#2 (Ldc#3) is located at the middle point in the range Th0. It is preferable for the range Th0 to be varied in accordance with how the level Ldc#2 (Ldc#3) is high or low. In FIG. 10, the range Th0 is wide for the relatively high level Ldc#2 in STATE A whereas it is narrow for the relatively low level Ldc#3 in STATE B.

As understood from the illustration of FIG. 10, the level criteria for determining that the level Ldc#2 (Ldc#3) is almost the same as the lowest level Ldcmin become more lenient as the level Ldc#2 (Ldc#3) is higher whereas more strict as the level Ldc#2 (Ldc#3) is lower.

Accordingly, the range Th0 is adjusted to be wider as the level Ldc#2 (Ldc#3) of the pixel Pdc#2 (Pdc#3) is higher whereas smaller as the level Ldc#2 (Ldc#3) of the pixel Pdc#2 (Pdc#3) is lower. The range adjustment makes possible accurate determination that the level Ldc#2 (Ldc#3) is almost the same as the lowest level Ldcmin in distinguishing between succeeding defective pixels and non-defective pixels via which an image such as the one illustrated in FIG. 9 is taken, in spite of how the level Ldc#2 (Ldc#3) is high or low.

The range Th0 is adjusted to be wider as the level Ldc#2 (Ldc#3) becomes higher in this embodiment. It may, however, be a specific fixed range when the level Ldc#2 (Ldc#3) reaches a certain high level.

Discussed further are the negative and positive reference levels Th0− and Th0+ for the range Th0 described above.

It is preferable for the negative and positive levels Th0− and Th0+ to be nonlinearly varied in accordance with how the level Ldc#2 (Ldc#3) is high or low. Under this nonlinear adjustments, the level Th0− (Th0+) may be obtained by adding a fixed reference level Th0base that is constant in spite of how the level Ldc#2 (Ldc#3) is high or low and a nonlinear variable reference level Th0vari that nonlinearly varies depending on the level Ldc#2 (Ldc#3). Or, the level Th0− (Th0+) may be obtained only with the nonlinear variable reference level Th0vari.

Explained below is the level Th0− (Th0+) obtained by addition of the fixed reference level Th0base and the nonlinear variable reference level Th0vari.

Figure 11:
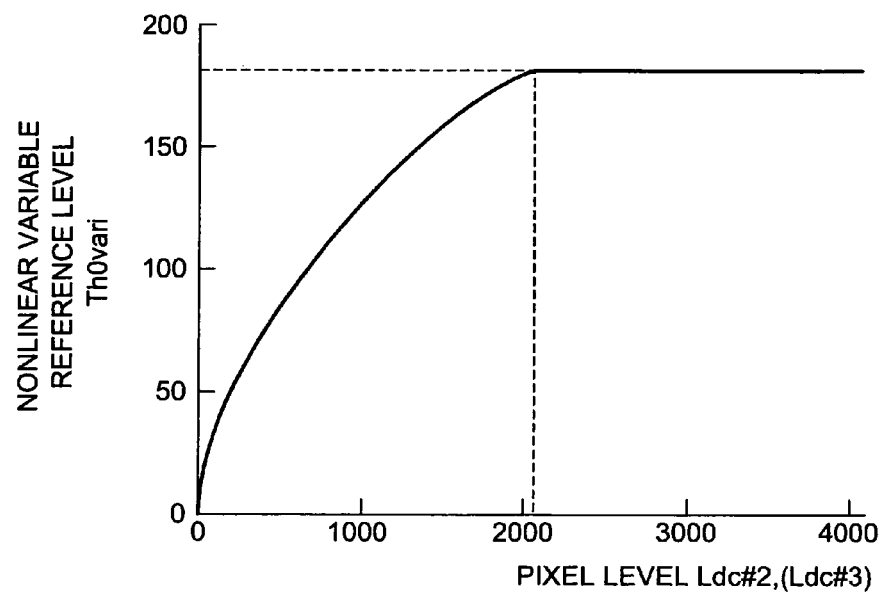
FIG. 11 illustrates non-linear characteristics of reference luminance levels used in defective-pixel detection and compensation in a preferred embodiment according to the present invention.

Illustrated in FIG. 11 is an exemplary characteristic curve of the nonlinear variable reference level Th0vari that nonlinearly varies depending on the level Ldc#2 (Ldc#3). The exemplary characteristic curve in FIG. 11 represents change in the level Th0vari for a 12-bit level Ldc#2 (Ldc#3) that varies from 0 to 4095. In detail, the level Th0vari rises in a curve varying from 0 to 180 for the level Ldc#2 (Ldc#3) that varies from 0 to 2047 and reaches a fixed level of 180 for the level Ldc#2 of 2048 or higher. Shown in FIG. 11 is just an exemplary characteristic curve for the level Th0vari. Instead of this exemplary curve, the level Th0vari may exhibit a characteristic curve rising from 0 to 180 with no such a fixed level of 180 when the level Ldc#2 (Ldc#3) is a 11-bit level. In other words, the level Th0vari may not always have such a fixed level of 180 for the level Ldc#2 (Ldc#3) even if the level Ldc#2 (Ldc#3) exceeds a certain level.

One requirement for the nonlinear variable reference level Th0vari is that it exhibits a characteristic curve that nonlinearly varies to the level Ldc#2 (Ldc#3) that varies from 0 to 180. In detail, the level Th0vari is required to exhibit a big change even if the level Ldc#2 (Ldc#3) exhibits a small change as the level Ldc#2 (Ldc#3) becomes a lower luminance level whereas exhibit a small change as the level Ldc#2 (Ldc#3) becomes a higher luminance level.

Figure 12:
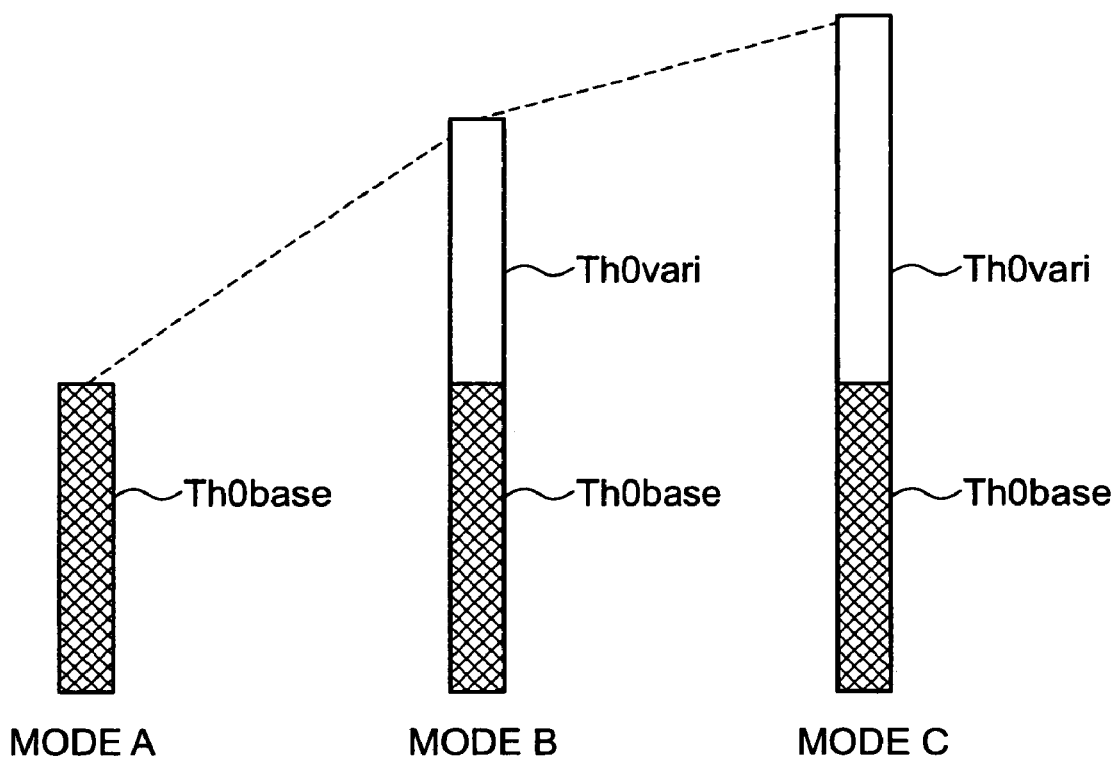
FIG. 12 illustrates non-linear-characteristic reference luminance levels used in defective-pixel detection and compensation in a preferred embodiment according to the present invention.

Illustrated in FIG. 12 are the following three modes of the level Th0− (Th0+) given by the fixed reference level Th0base only or by addition of the level Th0base and the nonlinear variable reference level Th0vari:

MODE A: Th0base in the lowest luminance-level state of the level Ldc#2 (Ldc#3);

MODE B: Th0base+Th0vari in the intermediate luminance-level state of the level Ldc#2 (Ldc#3); and MODE C: Th0base+Th0vari (higher than Th0vari in MODE B) in the highest luminance-level state of the level Ldc#2 (Ldc#3) at 2048 or higher.

As described above, the nonlinear variable reference level Th0vari is adjusted to have a bigger change to the lower level Ldc#2 (Ldc#3) whereas a smaller change to the higher level Ldc#2 (Ldc#3), as illustrated in FIGS. 11 and 12. The adjustments to the level Th0vari in this embodiment allows the target pixel Pt to be easily compensated at a relatively low luminance level in which a defective pixel is relatively noticeable whereas not to be easily compensated at a relatively high luminance level in which a defective pixel is relatively unnoticeable. Therefore, erroneous non-defective pixel compensation can be prevented with restriction of excessive compensation of the target pixel Pt at a relatively high luminance level.

Described next with respect to a flowchart shown in FIG. 13 are the operations of the defective-pixel detector 6 and the defective-pixel replacer 7 (FIG. 1) based on the principle of the defective-pixel detection and compensation methods explained above. The term "(detector 6)" or "(replacer 7)" attached to each step in the following description means that the step is carried by the defective-pixel detector 6 or the defective-pixel replacer 7, otherwise, by the controller 13.

In step S1, the average level Lscave is calculated for the same-color neighboring pixels Psc1 to Psc8 of the same color as the target pixel Pt (detector 6).

In step S2, the pixel Pscmax is extracted among the same-color pixels Psc1 to Psc8, from which a pixel signal of the highest luminance level Lscmax is generated and it is determined whether the level Lscmax is higher than a specific level that is the addition (Lscave+Th1) of the average level Lscave and the reference level Th1 (detector 6).

If NO in step S2, or the highest luminance level Lscmax is not higher than the level (Lscave+Th1), it is determined that the pixel Pscmax, from which a pixel signal of the level Lscmax is generated, is a normal or non-defective pixel (detector 6). The procedure then goes to step S5.

On the contrary, if YES in step S2, or the highest luminance level Lscmax is higher than the level (Lscave+Th1), the procedure goes to steps S3 and S4. These steps may however be reversed.

In step S3, the following two pixels are extracted: the pixel Pdc#2 from which a pixel signal of the second-highest level Ldc#2 is generated among the different-color surrounding pixels; and the pixel Pdcmin of the lowest level Ldcmin among the pixels of the same color as the pixel Pdc#2 (detector 6). Also, in step S3, it is determined whether the levels of the pixels Pdc#2 and Pdcmin are almost the same level as each other in accordance the level criteria explained above (detector 6).

The procedure goes to step S4, if YES in step S3, or when the levels of the pixels Pdc#2 and Pdcmin are almost the same level as each other whereas to step S5, if NO in step S3.

In step S4, the following two pixels are extracted: the pixel Pdc#3 from which a pixel signal of the third-highest level Ldc#3 is generated among the different-color surrounding pixels; and the pixel Pdcmin of the lowest level Ldcmin among the pixels of the same color as the pixel Pdc#3 (detector 6). Also, in step S4, it is determined whether the levels of the pixels Pdc#3 and Pdcmin are almost the same level as each other in accordance the level criteria explained above (detector 6).

The procedure goes to step S6, if YES in step S4, or when the levels of the pixels Pdc#3 and Pdcmin are almost the same level as each other whereas to step S5, if NO in step S4.

In the foregoing procedure, the determination of NO in step S2 that the highest luminance level Lscmax is not higher than the level (Lscave+Th1) corresponds to the situation illustrated in FIG. 4. Moreover, the determination of NO in step S3 and/or S4 that the levels Ldc#2 and/or Ldc3# (or at least either Ldc#2 or Ldc3# is) are not almost the same level as the lowest level Ldcmin corresponds to the situation illustrated in FIG. 7.

On determination of NO in either step S2, S3 or S4, the procedure goes to step S5 in which the pixel Pscmax is selected as a replacement pixel Pr for the target pixel Pt, from which pixel Pscmax a pixel signal of the highest level Lscmax is generated among the same-color neighboring pixels Psc1 to Psc8 (detector 6).

On the contrary, in the foregoing procedure, the determination of YES in step S2 that the highest luminance level Lscmax is higher than the level (Lscave+Th1), followed by the determination of YES in steps S3 and S4 that both of the levels Ldc#2 and Ldc3# are almost the same level as the lowest level Ldcmin, correspond to the situation illustrated in FIG. 5 or 6.

On determination of YES in all of steps S2, S3 and S4, the procedure goes to step S6 in which the pixel Psc#2 is selected as a replacement pixel Pr for the target pixel Pt, from which pixel sc#2 a pixel signal of the second-highest level Lsc#2 is generated among the same-color neighboring pixels Psc1 to Psc8 (detector 6).

When the replacement pixel Pr is decided, the procedure goes to step S7 to determine whether a level Lt of the target pixel Pt is higher than a specific level that is the addition (Lr+Th2) of a level Lr of the replacement pixel Pr and the reference level Th2 (detector 6).

The procedure goes to step S8 if NO in step S7, or the level Lt is not higher than the level (Lr+Th2) whereas step S9 if YES in step 57, or the level Lt is higher than the level (Lr+Th2).

The state determined as NO in step S7 that the level Lt is not higher than the level (Lr+Th2) indicates that the target pixel Pt is not defective or the pixel Pt causes generation of a pixel signal of luminance as high as a pixel signal from a defective pixel, via which an image such as illustrated in FIG. 7 is taken.

Then, in step S8 that follows the determination of NO in step 57 (detector 6), the pixel signal from the target pixel Pt is output with no compensation (replacer 7).

On the contrary, the state determined as YES in step S7 that the level Lt is higher than the level (Lr+Th2) indicates that the target pixel Pt is defective.

Then, in step S9 that follows the determination of YES in step S7 (detector 6), the pixel signal from the target pixel Pt is applied with pixel defect compensation by being replaced with the pixel signal from the replacement pixel Pr before being output (replacer 7).

The pixel signal from the replacement pixel Pr carries the highest level Lscmax among the pixel signals from the same-color neighboring pixels Psc1 to Psc8 when the target pixel Pt is only defective such as illustrated in FIG. 4. Or, the pixel signal from the replacement pixel Pr carries the second-highest level Lsc#2 among the pixel signals from the pixels Psc1 to Psc8 when one of these pixels is also defective like the pixel Pt such as illustrated in FIG. 5 or 6.

When it comes to the hardware shown in FIG. 1, based on the instruction from the defective-pixel detector 6 (through steps S1 to 57), the defective-pixel replacer 7 outputs the following pixel signal to the video-signal processor 8:

Pixel signal generated from the target pixel Pt with no pixel defect compensation (step S8); or Pixel signal generated from the replacement pixel Pr by which the pixel signal from the target pixel Pt is replaced in pixel defect compensation (step S9).

Figure 14:
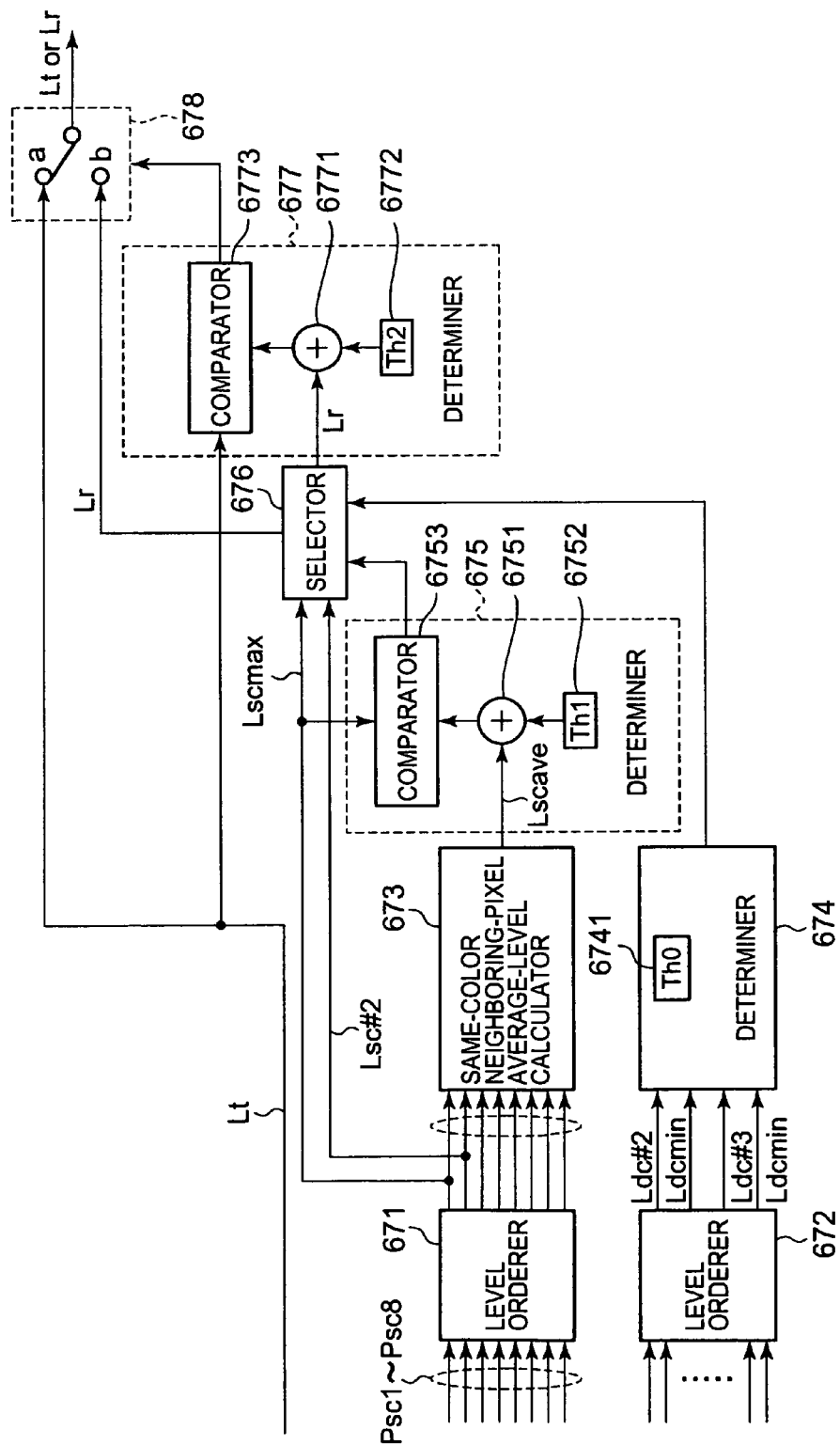
FIG. 14 shows an exemplary block diagram of the defective-pixel detector and the defective-pixel replacer shown in FIG. 1.

FIG. 14 shows an exemplary block diagram of hardware that achieves the functions (corresponding to steps S1 to S9 in FIG. 13) of the defective-pixel detector 6 and the defective-pixel replacer 7.

Supplied to a level orderer 671 from the pixel-signal generator 5 (FIG. 1) are the pixel signals from the same-color neighboring pixels Psc1 to Psc8. Supplied to a level orderer 672 from the generator 5 are the pixel signals from the different-color surrounding pixels.

The level orderer 671 applies level ordering to the pixel signals from the same-color neighboring pixels Psc1 to Psc8 to extract the pixel signals of the highest level Lscmax and second-highest level Lsc#2. The pixel signals of the levels Lscmax and Lsc#2 are supplied to a selector 676. The pixel signals from the pixels Psc1 to Psc8 are supplied to a same-color neighboring-pixel average-level calculator 673.

The level orderer 672 applies level ordering to the pixel signals from the different-color surrounding pixels to extract the pixel signals of the second-highest level Ldc#2, the third-highest level Ldc#3 and the lowest level Ldcmin which are supplied to a determiner 674.

The level orderer 671 is constituted by, for example, a plurality of comparators, to function as an extractor to extract the pixel signals of the highest level Lscmax and second-highest level Lsc#2 from the pixel signals from the same-color neighboring pixels Psc1 to Psc8.

The level orderer 672 is also constituted by, for example, a plurality of comparators, to function as an extractor to extract the pixel signals of the second-highest level Ldc#2, the third-highest level Ldc#3 and the lowest level Ldcmin from the pixel signals from the different-color surrounding pixels.

As already discussed, the pixel signal of the lowest level Ldcmin consists of one pixel signal that carries the lowest level of the color of the pixels Pdc#2 and Pdc#3 having the second-highest level Ldc#2 and the third-highest level Ldc#3, respectively, when the pixels Pdc#2 and Pdc#3 are of the same color. On the contrary, the pixel signal of the lowest level Ldcmin consists of two pixel signals each carrying the lowest level of its respective color when the pixels Pdc#2 and Pdc#3 are different colors. In FIG. 14, the pixel signals supplied to the determiner 674 are four pixel signals denoted by the symbols "Ldc#2", "Ldc#3", "Ldcmin" and "Ldcmin" for the case where the pixel signal of the lowest level Ldcmin consists of two pixel signals.

The same-color neighboring-pixel average-level calculator 673 calculates the average level Lscave of the levels of the pixel signals from the same-color neighboring pixels Psc1 to Psc8 supplied from the level orderer 671.

The calculated average Lscave is supplied to a determiner 675 that includes an adder 6751, a reference-level generator 6752, and a comparator 6753. The average level Lscave is added at the adder 6751 with the reference level Th1 generated by the generator 6752, the resulting added level (Lscave+Th1) being supplied to the comparator 6753. The level (Lscave+Th1) is compared with the highest level Lscmax of the pixel signal also supplied to the comparator 6753 from the level orderer 671. The comparator 6753 generates a first determination signal of, for example, "1" when the level Lscmax is higher than the level (Lscave+Th1) whereas "0" when the former is not higher than the latter. The first determination signal is then supplied to the selector 676. As described, the determiner 675 functions to determine whether the pixel Pscmax is defective or not by using the highest level Lscmax and the average level Lscave.

The determiner 674 functions to determine whether the difference between the levels Ldc#2 and Ldc#3, and the lowest level Ldcmin falls in the range Th0 decided by the reference levels Th0− and Th0+ generated from a reference-level generator 6741 implemented in the determiner 674.

The determiner 674 determines that the levels Ldc#2 and Ldc#3, and the lowest level Ldcmin are almost the same level as each other if the following expressions (1) and (2) are satisfied:

$$(Ldc\#2)-(Th0-) < Ldcmin < (Ldc\#2)-(Th0+) \quad (1)$$

$$(Ldc\#3)-(Th0-) < Ldcmin < (Ldc\#3)-(Th0+) \quad (2)$$

The range Th0 is varied depending on the levels Ldc#2 and Ldc#3, as illustrated in FIGS. 11 and 12. Thus, the reference-level generator 6741 may have a table of a plurality of reference levels Th0− and Th0+ depending on the levels Ldc#2 and Ldc#3. Or, the generator 6741 may have a calculator to calculate the reference levels Th0− and Th0+ depending on the levels Ldc#2 and Ldc#3 by using a specific formula.

Then, the determiner 674 generates a second determination signal of, for example, "1" when the levels Ldc#2 and Ldc#3, and the lowest level Ldcmin are almost the same level as each other whereas "0" when at least either the level Ldc#2 or Ldc#3 is not almost the same level as the level Ldcmin. The second determination signal of the determiner 674 is also supplied to the selector 676.

When the first determination signal of "0" is supplied from the determiner 675, the selector 676 selects the pixel signal of the highest level Lscmax supplied from the level orderer 671, irrespective of whether the second determination signal from the determiner 674 is "1" or "0".

In contrast, when the first determination signal of "1" is supplied from the determiner 675, the selector 676 selects the pixel signal of the highest level Lscmax or the second-highest level Lsc#2 supplied from the level orderer 671, depending on the second determination signal from the determiner 674, as follows: the selector 676 selects the pixel signal of the level Lscmax when the second determination signal of "0" is supplied whereas the pixel signal of the level Lsc#2 when the second determination signal of "1" is supplied.

It is noted that the determiner 674 may be omitted when the methods required to be implemented are only those described with reference to FIGS. 4 and 5 that are the basic methods of the defective-pixel detection and compensation methods in the embodiment. On the contrary, the determiner 674 is essential when the methods required to be implemented are those described with reference to FIGS. 6 to 9 that are advanced versions of the methods described with reference to FIGS. 4 and 5, in order to avoid erroneous compensation by distinguishing between normal pixels via which a high luminance-level image is taken and succeeding defective pixels.

The pixel signal of the highest level Lscmax or the second-highest level Lsc#2 selected by the selector 676 is supplied to a determiner 677 as the pixel signal of the replacement pixel Pr having the level Lr. The determiner 677 includes an adder 6771, a reference-level generator 6772, and a comparator 6753. The level Lr is added at the adder 6771 with the reference level Th2 generated by the generator 6772, the resulting added level (Lr+Th2) being supplied to the comparator 6773. The level (Lr+Th2) is compared with the level Lt of the pixel signal generated from the target pixel Pt and supplied to the comparator 6773 from the pixel-signal generator 5 (FIG. 1).

The comparator 6773 generates a third determination signal of, for example, "1" when the level Lt is higher than the level (Lr+Th2) whereas "0" when the former is not higher than the latter. The third determination signal is then supplied to a replacer 678. As described, the determiner 677 functions to determine whether the target pixel Pt is defective or not by using the levels Lt and Lr of the target pixel Pt and the replacement pixel Pr, respectively.

Input to the replacer 678 via terminals "a" and "b" are the pixel signal of the level Lt generated from the target pixel Pt and supplied from the pixel-signal generator 5 and that of the level Lr generated from the replacement pixel Pr and supplied from the selector 676. The replacer 678 outputs the pixel signal of the level Lt when the third determination signal of "0" is supplied from the determiner 677 whereas the pixel signal of the level Lr instead of the level Lt when the third determination signal of "1" is supplied.

With the configurations and operations described above, the pixel signal from that the target pixel Pt is correctly compensated when the pixel Pt is defective in the situations such as illustrated in FIGS. 4 to 6. In detail, pixel defect compensation is correctly performed in several situations, for example: when the pixel Pt is only defective such as illustrated in FIG. 4; when the pixel Pt and also one neighboring pixel are defective such as illustrated in FIG. 5; and when two or more or consecutive pixels including the pixel Pt are defective such as illustrated in FIG. 6, which is accurately distinguished from normal or non-defective pixels via which an image is taken such as illustrated in FIGS. 7.

In the foregoing disclosure, when it is determined that the pixel Pscmax of the highest level Lscmax is defective among the same-color neighboring pixels Psc1 to Psc8, the pixel Psc#2 of the second-highest level Lsc#2 is used as the replacement pixel Pr, not any of the pixels of the third-highest to the eighth-highest levels among the pixels Psc1 to Psc8. This is because erroneous pixel defect compensation tends to occur if any of the pixels of the third-highest to the eighth-highest levels among the pixels Psc1 to Psc8 are used as the replacement pixel Pr.

Therefore, the pixel Pscmax of the highest level Lscmax or the pixel Psc#2 of the second-highest level Lsc#2 among the same-color neighboring pixels Psc1 to Psc8 is used as the replacement pixel Pr in this embodiment for accurate pixel defect compensation.

In FIG. 1, the pixel signals are sequentially supplied to the video-signal processor 8 from the defective-pixel replacer 7 after each pixel signal is applied with the pixel defect compensation when the corresponding pixel is defective like the target pixel Pt described above. The pixel defect compensation in the present invention is thus real-time compensation for video signals generated from the imaging device 2 if defective pixels are involved in the solid-state imaging device 2b.

Moreover, in FIG. 1, the video signals supplied to the recorder/reproducer 9 or the display 11 are not generated based on the pixel signals from all of the pixels of the imaging device 2. This is because the pixel signals from the pixels on both edges in each of the horizontal and vertical directions in the imaging device 2 are not used in generation of such video signals. The pixels signals from all of the pixels including those on both edges in each of the horizontal and vertical directions in each video frame are subjected to the pixel defect compensation in the present invention if defective.

As disclosed above in detail, the present invention provides an imaging apparatus with pixel defect compensation function and a method of pixel defect compensation to compensate for pixel signals generated from defective pixels even if one or more of neighboring pixels close to each defective pixel are also defective.

Moreover, the pixel defect compensation in the present invention can function to prevent erroneous compensation of pixel signals for an image that is taken via non-defective pixels which could be erroneously determined as defective pixels due to their high luminance levels.

It is further understood by those skilled in the art that the foregoing descriptions are preferred embodiments of the disclosed apparatus and method and that various changes and modifications may be made in the invention without departing from the spirit and scope of thereof.

What is claimed is:

1. An imaging apparatus comprising:
    an imaging section that includes an optical filter having a plurality of color filters for a plurality of colors and arranged in horizontal and vertical directions and an imaging device having a plurality of pixels arranged so as to correspond to the color filters, the imaging section converting an input optical signal into pixel signals that correspond to the colors and sequentially outputting the pixel signals;
    a pixel-signal generating section, responsive to the sequentially output pixel signals, to output a first pixel signal generated from a target pixel among the pixels of the imaging device, second pixel signals generated from same-color neighboring pixels having the same color as the target pixel, and third pixel signals generated from different-color neighboring pixels having a different color from the target pixel, the same-color and different-color neighboring pixels belonging to the pixels of the imaging device and being located close to the target pixel on both sides of the target pixel in each of the horizontal and vertical directions;
    a first extractor to extract a highest-level pixel signal having a highest luminance level and a first second-level pixel signal having a first second luminance level next to the highest luminance level among the second pixel signals;
    an average-level calculation section to calculate an average luminance level of the second pixel signals;
    a first determining section to determine whether a particular pixel belonging to the same-color neighboring pixels and causing generation of the highest-level pixel signal is defective or not by using the highest luminance level and the average luminance level;
    a selecting section to select the highest-level pixel signal when it is determined that the particular pixel is not defective and to select the first second-level pixel signal when it is determined that the particular pixel is defective;
    a second determining section to determine whether the target pixel is defective or not by using a level of the first pixel signal and a level of the selected pixel signal; and
    a replacing section to output the first pixel signal when it is determined that the target pixel is not defective and to output the selected pixel signal in place of the first pixel signal when it is determined that the target pixel is defective.

2. The imaging apparatus according to claim 1, wherein the pixel-signal generating selection includes:
    line memories provided so as to correspond to the pixels arranged in the vertical direction in the imaging device and via which the pixel signals sequentially output from the imaging section are delayed per line in the vertical direction in the imaging device; and delay units provided so as to correspond to the pixels arranged in the horizontal direction in the imaging device, the delay units delaying, per pixel of the imaging device, the pixel signals sequentially output from the imaging section or a pixel signal delayed via each line memory.

3. The imaging apparatus according to claim 1, wherein the first determining section determines that the particular pixel causing the generation of the highest-level pixel signal is defective when the highest luminance level is higher than a level that is an addition of the average luminance level and a first reference level.

4. The imaging apparatus according to claim 1, wherein the second determining section determines that the target pixel is defective when the level of the first pixel signal is higher than a level that is an addition of the level of the selected pixel signal and a second reference level.

5. The imaging apparatus according to claim 1 further comprising:
a second extractor to extract a second second-level pixel signal, a third-level pixel signal, a first lowest-level pixel signal, and a second lowest-level pixel signal, among the third pixel signals, the second second-level pixel signal having a second second luminance level next to a highest luminance level among the third pixel signals, the third-level pixel signal having a third luminance level next to the second second luminance level, the first lowest-level pixel signal being generated from a pixel of the same color as a first pixel causing generation of the second second-level pixel signal, the first lowest-level pixel signal having a lowest luminance level among pixel signals in the third pixel signals and generated from pixels of the same color as the first pixel, the second lowest-level pixel signal being generated from a pixel of the same color as a second pixel causing generation of the third-level pixel signal, and the second lowest-level pixel signal having the lowest luminance level among pixel signals in the third pixel signals and generated from pixels of the same color as the second pixel; and
a third determining section to determine whether the lowest luminance level of the first lowest-level pixel signal falls in a first specific range from a positive certain level to a negative certain level in which the second second luminance level of the second second-level pixel signal is located at a mid point of the first specific range and the lowest luminance level of the second lowest-level pixel signal falls in a second specific range from a positive certain level to a negative certain level in which the third luminance level of the third-level pixel signal is located at a mid point in the second specific range or at least either the level of the first or the second lowest-level pixel signal does not fall in the first or the second specific range,
wherein the selecting section selects the second second-level pixel signal when it is determined that the lowest luminance level of the first lowest-level pixel signal falls in the first specific range and the lowest luminance level of the second lowest-level pixel signal falls in the second specific range, and selects the highest-level pixel signal when it is determined that at least either level of the first or the second lowest-level pixel signal does not fall in the first or the second specific range.

6. The imaging apparatus according to claim 5, wherein at least either the first or the second specific range is adjusted to be wider as the second second luminance level or the third luminance level becomes higher and adjusted to be smaller as the second second luminance level or the third luminance level becomes lower.

7. The imaging apparatus according to claim 6, wherein the specific range is adjusted to exhibit a bigger change when the second second luminance level or the third luminance level varies depending on the sequential pixel signals as the second second luminance level or the third luminance level becomes lower and adjusted to exhibit a smaller change when the second second luminance level or the third luminance level varies depending the sequential pixel signals as the second second luminance level or the third luminance level becomes higher.

8. A pixel-defect compensation method comprising:
a converting-and-outputting step of converting an input optical signal, via an imaging device having a plurality of pixels arranged in horizontal and vertical directions for a plurality of colors, into pixel signals that correspond to the colors and sequentially outputting the pixel signals;
a pixel-signal generating step of, responsive to the sequentially output pixel signals, outputting a first pixel signal generated from a target pixel among the pixels of the imaging device, second pixel signals generated from same-color neighboring pixels having the same color as the target pixel, and third pixel signals generated from different-color neighboring pixels having a different color from the target pixel, the same-color and different-color neighboring pixels belonging to the pixels of the imaging device and being located close to the target pixel on both sides of the target pixel in each of the horizontal and vertical directions;
a first extracting step of extracting a highest-level pixel signal having a highest luminance level and a first second-level pixel signal having a first second luminance level next to the highest luminance level among the second pixel signals;
an average-level calculating step of calculating an average luminance level of the second pixel signals;
a first determining step of determining whether a particular pixel belonging to the same-color neighboring pixels and causing generation of the highest-level pixel signal is defective or not by using the highest luminance level and the average luminance level;
a selecting step of selecting the highest-level pixel signal when it is determined that the particular pixel is not defective and selecting the first second-level pixel signal when it is determined that the particular pixel is defective;
a second determining step of determining whether the target pixel is defective or not by using a level of the first pixel signal and a level of the selected pixel signal; and
an outputting step of outputting the first pixel signal when it is determined that the target pixel is not defective and outputting the selected pixel signal in place of the first pixel signal when determined that the target pixel is defective.

9. The pixel-defect compensation method according to claim 8, wherein it is determined in the first determining step that the particular pixel causing the generation of the highest-level pixel signal is defective when the highest luminance level is higher than a level that is an addition of the average luminance level and a first reference level.

10. The pixel-defect compensation method according to claim 8, wherein it is determined in the second determining step that the target pixel is defective when the level of the first pixel signal is higher than a level that is an addition of the level of the selected pixel signal and a second reference level.

11. The pixel-defect compensation method according to claim 8 further comprising:

a second extracting step of extracting a second second-level pixel signal, a third-level pixel signal, a first lowest-level pixel signal, and a second lowest-level pixel signal, among the third pixel signals, the second second-level signal having a second second luminance level next to a highest luminance level among the third pixel signals, the third-level pixel signal having a third luminance level next to the second second luminance level, the first lowest-level pixel signal being generated from a pixel of the same color as a first pixel causing generation of the second second-level pixel signal, the first lowest-level pixel signal having the lowest luminance level among pixel signals in the third pixel signals and generated from pixels of the same color as the first pixel, the second lowest-level pixel signal being generated from a pixel of the same color as a second pixel causing generation of the third-level pixel signal, and the second lowest-level pixel signal having the lowest luminance level among pixel signals in the third pixel signals and generated from pixels of the same color as the second pixel; and a third determining step of determining whether the lowest luminance level of the first lowest-level pixel signal falls in a first specific range from a positive certain level to a negative certain level in which the second second luminance level of the second second-level pixel signal is located at a mid point of the first specific range and the lowest luminance level of the second lowest-level pixel signal falls in a second specific range from a positive certain level to a negative certain level in which the third luminance level of the third-level pixel signal is located at a mid point in the second specific range or at least either the level of the first or the second lowest-level pixel signal does not fall in the first or the second specific range, wherein, in the selecting step, the second second-level pixel signal is selected when it is determined that the lowest luminance level of the first lowest-level pixel signal falls in the first specific range and the lowest luminance level of the second lowest-level pixel signal falls in the second specific range, and the highest-level pixel signal is selected when it is determined that at least either level of the first or the second lowest-level pixel signal does not fall in the first or the second specific range.

12. The pixel-defect compensation method according to claim 11, wherein, in the third determining step, at least either the first or the second specific range is adjusted to be wider as the second second luminance level or the third luminance level becomes higher and adjusted to be smaller as the second second luminance level or the third luminance level becomes lower.

13. The pixel-defect compensation method according to claim 12, wherein, in the third determining step, the specific range is adjusted to exhibit a bigger change when the second second luminance level or the third luminance level varies depending on the sequential pixel signals as the second luminance level or the third luminance level is becomes lower and adjusted to exhibit a smaller change when the second second luminance level or the third luminance level varies depending the sequential pixel signals as the second second luminance level or the third luminance level becomes higher.

* * * * *